(12) United States Patent
Yoon

(10) Patent No.: US 7,258,492 B2
(45) Date of Patent: Aug. 21, 2007

(54) SELF-LOCKING STRUCTURE OF SPLIT ROLLER BEARING CAGE

(76) Inventor: Suk Tae Yoon, 337-1, Sinsa 2-dong, Eunpyeong-gu, Seoul (KR) 122-891

( * ) Notice: Subject to any disclaimer, the term of this patent is extended or adjusted under 35 U.S.C. 154(b) by 127 days.

(21) Appl. No.: 11/180,517

(22) Filed: Jul. 14, 2005

(65) Prior Publication Data

US 2006/0204159 A1    Sep. 14, 2006

(30) Foreign Application Priority Data

Mar. 14, 2005    (KR) .............. 10-2005-0021141

(51) Int. Cl.
*F16C 33/38* (2006.01)
(52) U.S. Cl. .................. 384/523; 384/573
(58) Field of Classification Search ........ 384/523–534, 384/572–580; 24/24, 20 EE; 403/313, 344, 403/329

See application file for complete search history.

(56) References Cited

U.S. PATENT DOCUMENTS

| | | | |
|---|---|---|---|
| 4,239,304 A | * | 12/1980 | Wakunami .............. 384/573 |
| 4,397,507 A | * | 8/1983 | Kraus et al. ............ 384/576 |
| 5,178,474 A | * | 1/1993 | Muntnich et al. ........ 384/577 |
| 5,743,659 A | * | 4/1998 | Stewart ................... 384/573 |
| 6,261,005 B1 | * | 7/2001 | Winkler et al. .......... 384/577 |
| 6,406,190 B1 | | 6/2002 | Yoon |
| 6,709,163 B2 | * | 3/2004 | van der Knokke ....... 384/523 |

FOREIGN PATENT DOCUMENTS

| | | |
|---|---|---|
| JP | 04-357326 | 12/1992 |
| JP | 06-73443 | 10/1994 |
| JP | 2000-320557 | 11/2000 |

* cited by examiner

*Primary Examiner*—Thomas R. Hannon
(74) *Attorney, Agent, or Firm*—James Creighton Wray

(57) ABSTRACT

A self-locking structure of a split roller bearing cage includes recesses, locker plates and locking projections. The recesses are defined in outer circumferential surfaces of opposite joint ends of two semicircular split roller bearing cage half-parts along horizontally inscribed tangential lines, that meet an outer circumference of the annular split roller bearing cage and intersect perpendicular with a split center axis of the annular split roller bearing cage. Recesses have widths and depths suitable to receive locker plates. The locker plates are horizontally attached to bottoms of the recesses defined in opposite joint ends of one of the cage half-parts. Locking projections are formed at bottoms of other recesses defined in opposite joint ends of the other cage half-parts to be coupled with respective locker plates. The two cage half-parts are aligned and engaged at their joint ends, forming a full circle. The locker plates can be automatically coupled to the locking projections.

6 Claims, 4 Drawing Sheets

SELF-LOCKING STRUCTURE OF SPLIT ROLLER BEARING CAGE

BACKGROUND OF THE INVENTION

This application claims the benefit of Korean Application No. 10-2005-0021141 filed Mar. 14, 2005, which is hereby incorporated by reference in its entirety.

1. Field of the Invention

The present invention relates to a self-locking structure of a split roller bearing cage.

2. Description of the Related Art

Generally, when it is desired to frequently exchange a rotating shaft and a bearing, the bearing is preferable to take the form of a split roller bearing in order to facilitate separation/coupling with the rotating shaft. In such a split roller bearing, its split roller bearing cage, which is internally coupled to a bearing inner race and externally coupled to a bearing outer race, is split into two semicircular half parts along a split center axis. In use, the split roller bearing cage half parts are aligned to form a full circle, and are firmly engaged, at their opposite joint ends, to each other under assistance of locking means to substantially prevent unwanted separation therebetween before being mounted in a block case.

Considering an exemplary configuration of prior art locking means for use in such a split roller bearing cage, screw-holes are formed at opposite joint ends of two semicircular half parts of the split roller bearing cage, and connector plates are arranged over the opposite joint ends of the cage half parts, which were accurately aligned with each other to form a full circle. As screws are fastened through the screw-holes of the cage half parts and the connector plates, the two cage half parts are combined with each other via the connector plates.

Such a locking means, however, has a troublesome use problem. For example, in certain mechanical devices using a special large number of bearings, such as roller conveyers, cast-iron rolling rolls, etc., a plurality of screws must be fastened to or unfastened from the locking means one by one whenever it is required to combine or split a split roller bearing for the exchange of an associated rotating shaft. This results in very consumptive labor and time and consequently only a low operational efficiency.

SUMMARY OF THE INVENTION

Therefore, the present invention has been made in view of the above problems, and it is an object of the present invention to provide a self-locking structure of a split roller bearing cage in which a pair of locker plates can be automatically coupled to respective locking projections by simply engaging opposite joint ends of two semicircular split roller bearing cage half parts and also be easily separable therefrom by slightly pushing the locker plates upward, thereby achieving simple and rapid combining or separation of the two split roller bearing cage half parts.

In accordance with the present invention, the above and other objects can be accomplished by the provision of a self-locking structure of a split roller bearing cage comprising: recesses defined in outer circumferential surfaces of opposite joint ends of respective semicircular split roller bearing cage half parts along horizontally inscribed tangential lines, that meet an outer circumference of the annular split roller bearing cage and intersect perpendicular with a split center axis of the two semicircular cage half parts, the recesses having widths and depths suitable to receive locker plates; the locker plates horizontally attached to bottoms of the respective recesses defined at the opposite joint ends of one of the cage half parts, i.e. first cage half part; and locking projections protruding from bottoms of the other respective recesses defined at the opposite joint ends of the other cage half part, i.e. second cage half part.

Preferably, each locker plate, attached to the bottom of an associated one of the recesses of the first cage half part by riveting, may include: a guide leading portion having a predetermined inclination; a locking hole configured to receive an associated one of the locking projections; and an elastic trailing portion adapted to allow the locker plate to continuously come into close contact with the bottom of the recess without a risk of unwanted separation.

Preferably, each locking projection, protruding from the bottom of an associated one of the recesses of the second cage half part, may include: an inclined guiding surface provided at a lateral side thereof to effectively guide the guide leading portion of the locker plate toward an upper end of the locking projection; and a vertical locking edge portion provided at an opposite side of the inclined guiding surface to capture the locking hole of the locker plate.

Preferably, all of the locker plates and locking projections may be provided at the horizontal bottoms of the recesses to be positioned internally relative to the outer circumference of the split roller bearing cage.

According to the present invention configured as stated above, as the two semicircular split roller bearing cage half parts are aligned to surround a bearing inner race and are engaged with each other at their opposite joint ends, the guide leading portions of the locker plates, which are mounted at the opposite joint ends of the first cage half part, smoothly pass over the upper ends of the locking projections by being guided along the inclined guiding surfaces of the locking projections, which are mounted at the opposite joint ends of the second cage half part. Thereby, the locking projections are tightly fitted in the locking holes of the locker plates and simultaneously the locker plates come into close contact with the bottoms of the recesses by virtue of their elasticity. In this case, the locking holes of the locker plates are stably captured by the locking edge portions of the locking projections. This substantially prevents unwanted separation between the locker plates and the locking projections so long as the locker plates are not manually unlocked.

Herein, other procedures of coupling the split roller bearing cage to bearing inner and outer races and then coupling the resulting combination to a block case follow standard procedures, and thus their description is omitted.

Meanwhile, when it is desired to split the combined split roller bearing cage into the two semicircular roller bearing cage half parts, it is preferable to push the inclined guide leading portions of the locker plates upward by using simple tools, such as screwdrivers. As a result, the locking holes of the locker plates escape from the upper ends of the locking projections via elastic motion of the locker plates, resulting in rapid and convenient separation of the two cage half parts.

As can be clearly understood from the above description, the combining or separation of the two split roller bearing cage half parts can be simply achieved via only a single operation, therefore, the present invention achieves an advantage that exchanging of a large number of split roller bearings from associated rotating shafts can be effectively performed with reduced labor.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred exemplary embodiment of the present invention will be explained with reference to the accompanying drawings.

Figure 1:
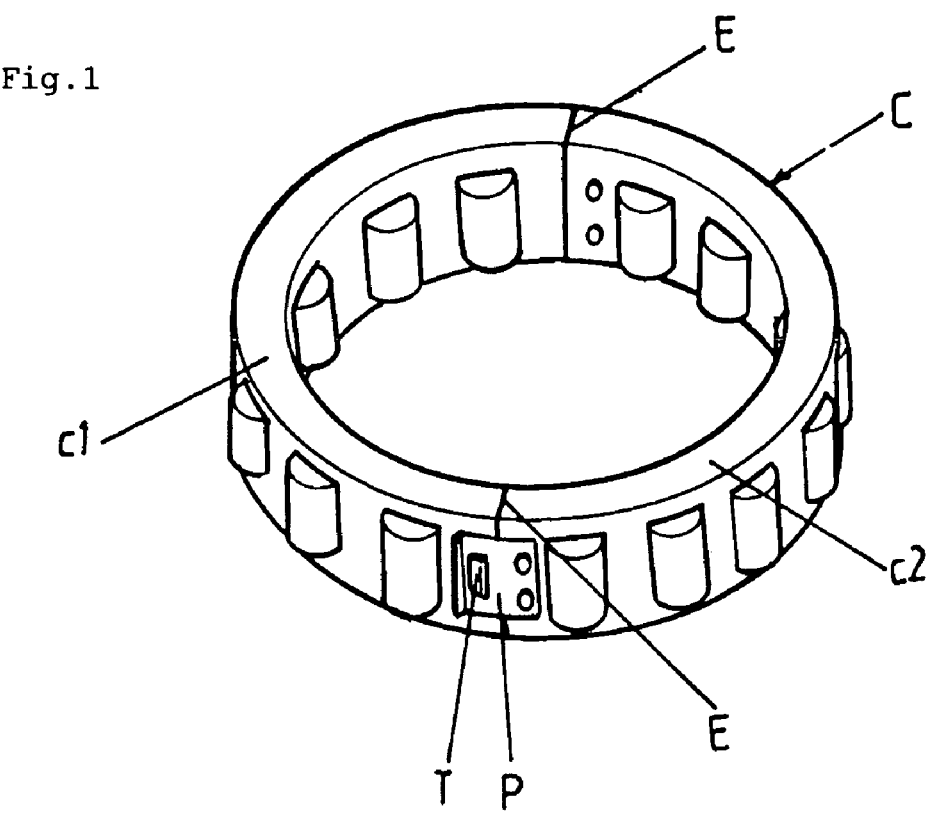
FIG. 1 is a perspective view of a combined split roller bearing cage in accordance with a preferred exemplary embodiment of the present invention, with a locker plate and locking projection engaged with each other.
Figure 2:
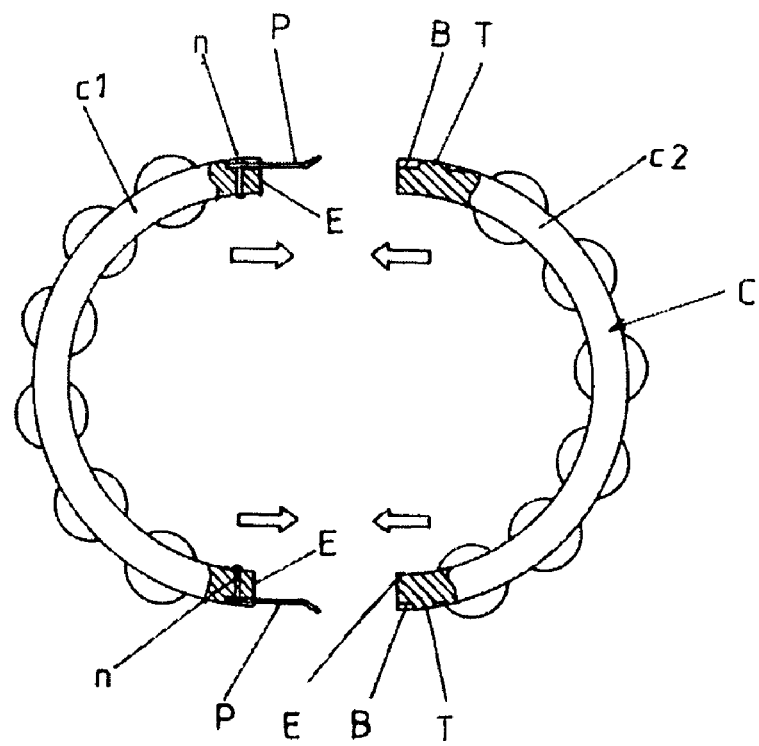
FIG. 2 is a partially broken away cross-sectional view of two semicircular split roller bearing cage half parts, with the locker plate and locking projection separated from each other.
Figure 3:
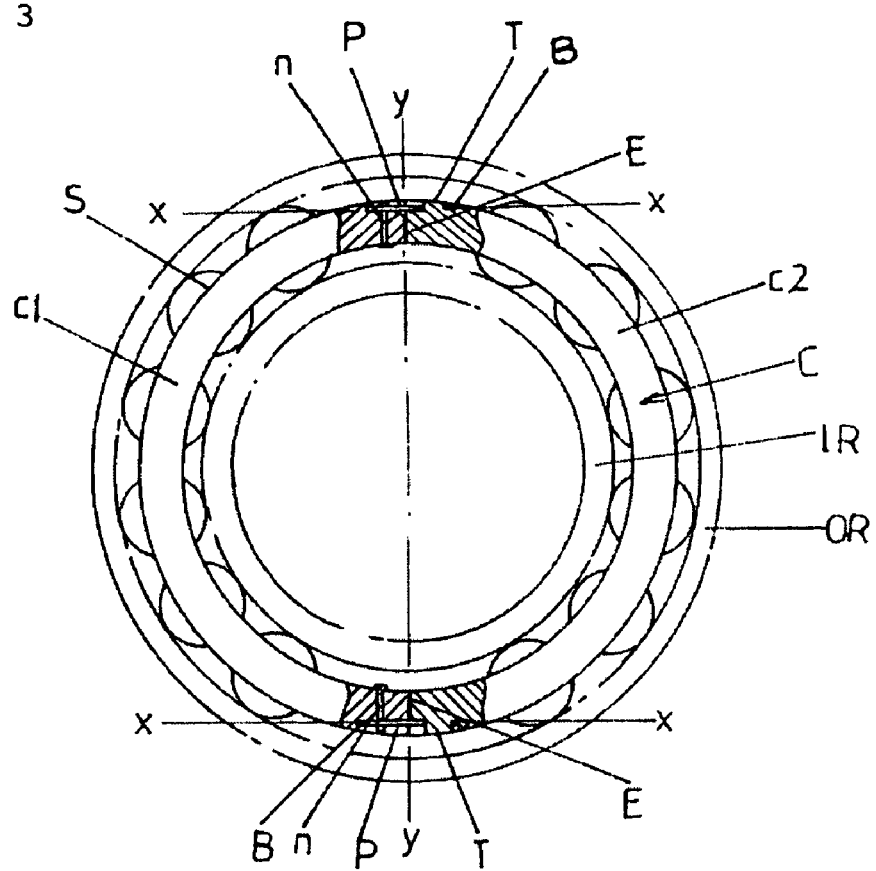
FIG. 3 is a partially broken away cross-sectional view of the split roller bearing cage of FIG. 1.

FIG. 1 is a perspective view of a combined split roller bearing cage in accordance with a preferred exemplary embodiment of the present invention, with a locker plate and locking projection engaged with each other. FIG. 2 is a partially broken away cross-sectional view of two semicircular split roller bearing cage half parts, with the locker plate separated from the locking projection. FIG. 3 is a partially broken away cross-sectional view of the split roller bearing cage of FIG. 1.

The present invention provides a self-locking structure to combine two semicircular split roller bearing cage half parts c1 and c2 into an annular split roller bearing cage C. Such a locking structure comprises four recesses B, a pair of locker plates P and a pair of locking projections T.

Referring to FIG. 3, the recesses B are defined in outer circumferential surfaces of opposite joint ends E of the two semicircular split roller bearing cage half parts c1 and c2 along horizontally inscribed tangential lines x. Here, the horizontally inscribed tangential lines x are lines that meet an outer circumference S of the annular split roller bearing cage C and also intersect perpendicular with a split center axis y of the two semicircular cage half parts c1 and c2. The recesses B have widths and depths suitable to receive the locker plates P. A respective one of the locker plates P is horizontally attached to a bottom b1 of the respective recesses defined in the opposite joint ends E of one of the cage half parts, i.e. first cage half part c1. Further, a respective one of the locking projections T is formed at a bottom b2 of the other respective recesses defined in the opposite joint ends E of the other cage half part, i.e. second cage half part c2.

Figure 4:
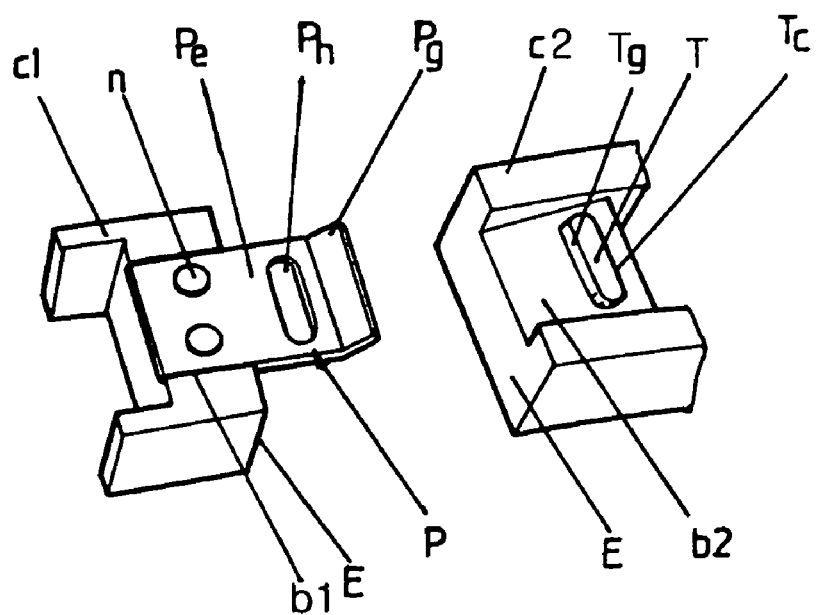
FIG. 4 is a perspective view of the locker plate and the locking projection.
Figure 5:
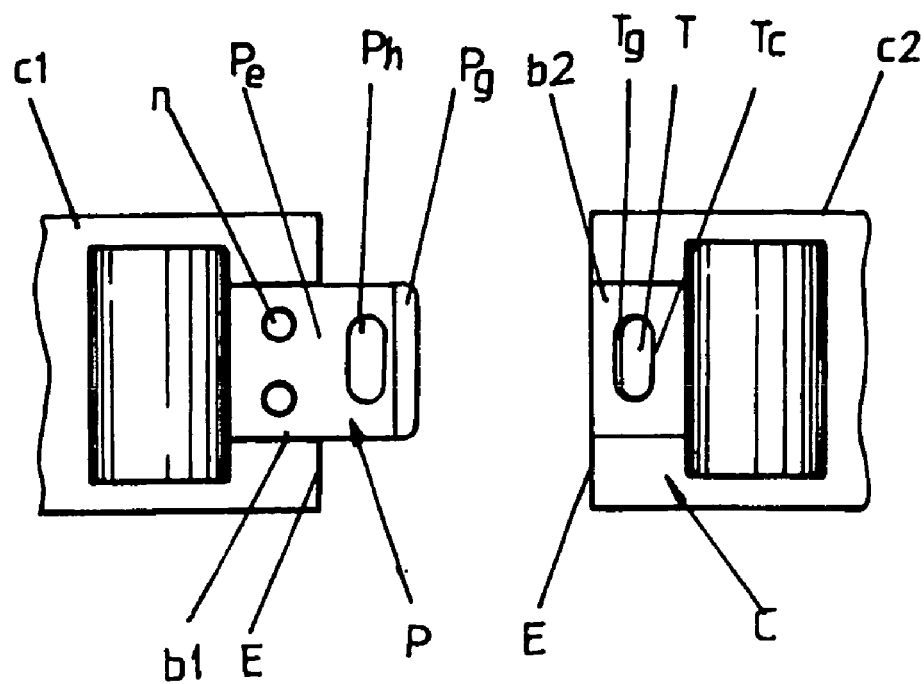
FIG. 5 is a plan view of FIG. 4.
Figure 6:
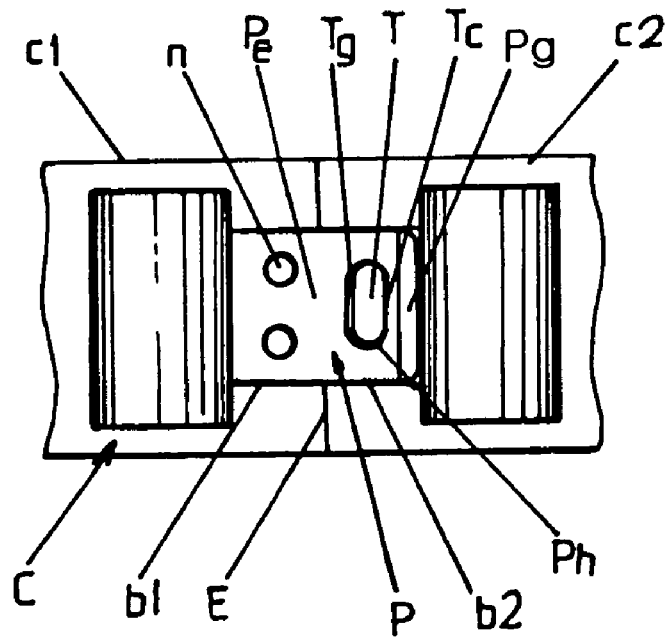
FIG. 6 is a plan view showing a coupled state of the locker plate and the locking projection.

FIGS. 4 and 5 are a perspective view and a plan view of the locker plate P and the locking projection T, and FIG. 6 is a plan view showing a coupled state of the locker plate P and the locking projection T.

Referring to FIGS. 4 to 6, the locker plate P is attached to the bottom b1 of the recess B defined in the first cage half part c1 by using a plurality of rivets n. Such a locker plate P includes a guide leading portion Pg having a predetermined inclination, for example 30°, an elliptical locking hole Ph configured to tightly receive the locking projection T, and an elastic trailing portion Pe adapted to allow the locker plate P to continuously come into close contact with the bottom b1 of the recess B in order to maintain the coupling of the locker plate P and locking projection T or be elastically movable to be separated from the locking projection T.

The locking projection T has an elliptical cross section and protrudes from the bottom b2 of the recess B defined in the second cage half part c2. Such a locking projection T has an inclined guiding surface Tg provided at a lateral side thereof to effectively guide the guide leading portion Pg of the locker plate P toward an upper end of the locking projection T, and a vertical locking edge portion Tc provided at an opposite side of the inclined guiding surface to capture the locking hole Ph of the locker plate P.

The locker plate P and the locking projection T are seated in the horizontal bottoms b1 and b2 of the recesses B having a predetermined depth from the outer circumference S of the roller bearing cage C, therefore the locker plate P is positioned internally relative to the outer circumference S of the split roller bearing cage C. This is effective to completely prevent the locker plate P from interfering with operation of a bearing outer race OR.

Figure 7:
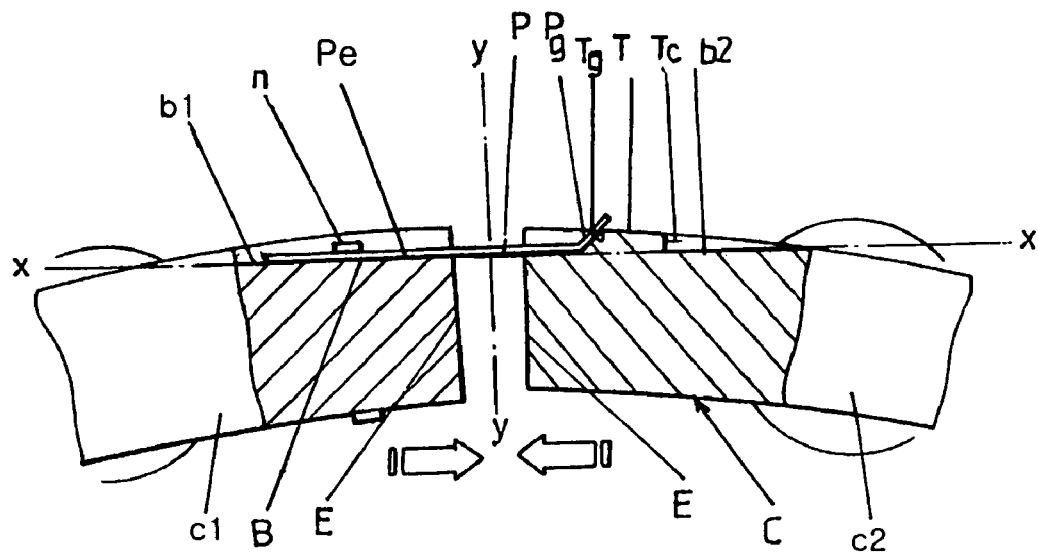
FIG. 7 is an explanatory cross-sectional view showing the coupling of the locker plate and the locking projection.

In use, the two semicircular split roller bearing cage half parts c1 and c2 are aligned with each other in a direction designated by arrows in FIG. 2 to surround a bearing inner race IR located thereinside, and are engaged with each other at their opposite joint ends E. After that, the bearing outer race OR is coupled around the combined cage half parts c1 and c2. Referring to FIG. 7, as the respective locker plates P, provided at the first cage half part c1, horizontally move toward the bottoms b2 of the recesses B defined in the second cage half part c2, the guide leading portions Pg of the locker plates P smoothly pass over the upper ends of the locking projections T by being guided along the inclined guiding surfaces Tg of the locking projections T, thereby causing the locking projections T to be captured by the locking holes Ph of the locker plates P. In this case, the locker plates P, provided at the opposite joint ends E of the first cage half part c1, act as guidance means to assist easy alignment and engagement of the joint ends E of the two cage half parts c1 and c2.

Meanwhile, at specific locations where the opposite joint ends E of the two semicircular roller bearing cage half parts c1 and c2 accurately come into close contact with each other along the split center axis y, the locking projections T are captured in the locking holes Ph of the locker plates P, and simultaneously, the locker plates P comes into close contact with the bottoms b1 and b2 of the recesses B by virtue of the elasticity of the elastic trailing portion Pe thereof.

This completely prevents the locking holes Ph of the locker plates P from unintentionally escaping from the locking projections T, thereby stably maintaining the combined state of the split roller bearing cage C. Thereby, the locking holes Ph of the locker plates P are not released from the vertical locking edge portions Tc of the locking projections T so long as the locker plates P are not manually unlocked.

Figure 8:
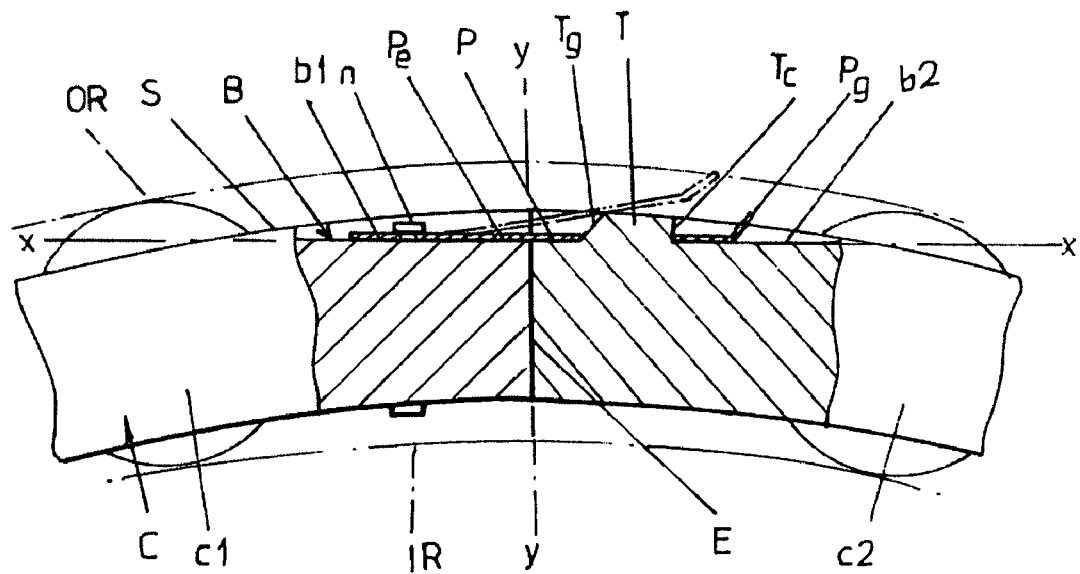
FIG. 8 is an explanatory cross sectional view showing the separation of the locker plate and the locking projection.

Referring to FIG. 8, to split the combined split roller bearing cage C into the two semicircular roller bearing cage half parts c1 and c2, the inclined guide leading portion Pg of the locker plate P is slightly pushed upward by using certain simple tools, such as screwdrivers. Thereby, the locking holes Ph of the locker plates P escape from the upper ends of the locking projections T via elastic motion of the locker plates P, resulting in easy separation of the two cage half parts c1 and c2.

As apparent from the above description, the present invention provides a self-locking structure of a split roller bearing cage comprising: recesses defined in outer circumferential surfaces of opposite joint ends of two semicircular split roller bearing cage half parts along horizontally inscribed tangential lines, that meet an outer circumference of the annular split roller bearing cage and also intersect perpendicular with a split center axis of the two semicircular cage half parts, the recesses having widths and depths suitable to receive locker plates; the locker plates horizontally attached to bottoms of the recesses defined in one of the cage half parts; and locking projections protruding from bottoms of the other recesses defined in the other cage half part. With such a self-locking structure, as the two semicircular cage half parts are aligned with each other to define a full circle and are engaged at their joint ends with each other, the locker plates can be automatically coupled to the locking projections.

Further, according to the present invention, each locker plate has an inclined leading guide portion, a locking hole and an elastic trailing portion, and each locking projection has an inclined guiding surface and a vertical locking edge portion. Thereby, the locker plate can be easily guided along the locking projection via the interaction of the leading guide portion and the guiding surface. This allows the locking hole of the locker plate to be easily captured by the locking edge portion of the locking projection, and simultaneously, the locker plate to come into close contact with the bottoms of the recesses by the elasticity of the elastic trailing portion thereof without a risk of unwanted separation from the locking projection.

In this way, so long as the locker plate is not manually unlocked, the locking hole of the locker plate can be stably and continuously kept in the captured state by the locking projection.

Furthermore, according to the present invention, the combining of the two split roller bearing cage half parts as well as the engagement of the locker plate and locking projection can be simply achieved via only a single operation. Therefore, exchanging of a large number of split roller bearings from associated rotating shafts can be effectively performed with reduced labor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A self-locking structure of a split roller bearing cage comprising:
   recesses defined in outer circumferential surfaces of opposite joint ends of two semicircular split roller bearing cage half parts along horizontally inscribed tangential lines, that meet an outer circumference of the annular split roller bearing cage and intersect perpendicular with a split center axis of the annular split roller bearing cage;
   locker plates horizontally attached to bottoms of the recesses defined in the opposite joint ends of a first cage half part; and
   locking projections formed at bottoms of the other recesses defined in the opposite joint ends of a second cage half part, the locking projections being coupled with the respective locker plates,
   wherein, as the first and second cage half parts are aligned and engaged at their joint ends with each other to form a full circle, the locker plates can be automatically coupled to the locking projections, respectively.

2. The structure as set forth in claim 1, wherein the recesses defined in the opposite joint ends of the first and second cage half parts have widths and depths suitable to receive the locker plates.

3. The structure as set forth in claim 1, wherein each locker plate, attached to the bottom of an associated one of the recesses defined in the first cage half part, includes:
   a guide leading portion having a predetermined inclination;
   a locking hole configured to tightly receive the locking projection; and
   an elastic trailing portion to allow the locker plate to continuously come into close contact with the bottom of the recess in an elastic manner.

4. The structure as set forth in claim 1, wherein each locking projection, protruding from the bottom of an associated one of the recesses defined in the second cage half part, includes:
   an inclined guiding surface provided at a lateral side thereof to effectively guide a guide leading portion of the locker plate toward an upper end of the locking projection; and
   a vertical locking edge portion to capture a locking hole of an associated one of the locker plates.

5. The structure as set forth in claim 1, wherein the locker plates, seated on the bottoms of the recesses of the first cage half part, and the locking projections, protruding from the bottoms of the recesses of the second cage half part, are positioned internally relative to the outer circumference of the split roller bearing cage.

6. A self-locking structure of a split roller bearing cage comprising:
   two semicircular split roller bearing cage half parts;
   recesses defined in outer circumferential surfaces of opposite joint ends of the two semicircular split roller bearing cage half parts along horizontally inscribed tangential lines, that meet an outer circumference of the annular split roller bearing cage and intersect perpendicular with a split center axis of the annular split roller bearing cage;
   locker plates horizontally attached to bottoms of the recesses defined in the first opposite joint ends of the cage half parts; and
   locking projections formed at bottoms of the recesses defined in the second opposite joint ends of the cage half parts, the locking projections being coupled with the respective locker plates,
   wherein, as the two semicircular cage half parts are aligned and engaged at their joint ends with each other to form a full circle, the locker plates can be automatically coupled to the locking projections, respectively.

* * * * *